US012518060B2

(12) United States Patent
Chen et al.

(10) Patent No.: US 12,518,060 B2
(45) Date of Patent: Jan. 6, 2026

(54) SOCIAL MEDIA NETWORK DIALOGUE AGENT

(71) Applicant: Lemon Inc., Grand Cayman (KY)

(72) Inventors: Fan Chen, Los Angeles, CA (US); Kin Chung Wong, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 199 days.

(21) Appl. No.: 18/346,707

(22) Filed: Jul. 3, 2023

(65) Prior Publication Data

US 2025/0013788 A1 Jan. 9, 2025

(51) Int. Cl.
G06F 21/62 (2013.01)
G06F 40/40 (2020.01)
H04N 21/472 (2011.01)

(52) U.S. Cl.
CPC ............ G06F 21/629 (2013.01); G06F 40/40 (2020.01); H04N 21/47205 (2013.01); G06F 2221/2113 (2013.01)

(58) Field of Classification Search
CPC ........... G06F 21/629; G06F 2221/2113; H06F 40/40; H04N 21/47205
USPC .......................................................... 726/27
See application file for complete search history.

(56) References Cited

U.S. PATENT DOCUMENTS 11,960,500 B1 * 4/2024 Sboychakova ......... G06F 40/20
2008/0134282 A1 6/2008 Fridman et al.
2017/0228384 A1 8/2017 Caruso et al.
2019/0108276 A1 * 4/2019 Kovács ................. G06F 16/243
2019/0163728 A1 5/2019 Koren et al.
2019/0179895 A1 6/2019 Bhatt et al.
2019/0196696 A1 6/2019 Patel et al.

(Continued)

FOREIGN PATENT DOCUMENTS

CN 107685824 A 2/2018
CN 110389796 A 10/2019

(Continued)

OTHER PUBLICATIONS

Chang, Y. et al., "A Survey on Evaluation of Large Language Models," ACM Transactions on Intelligent Systems and Technology, vol. 15, No. 3, Mar. 29, 2024, 45 pages.

(Continued)

*Primary Examiner* — Lan Dai T Truong
(74) *Attorney, Agent, or Firm* — Alleman Hall & Tuttle LLP

(57) ABSTRACT

Examples are provided relating to implementing actions on social media network content based on natural language inputs. One aspect includes a computing system configured to implement a social media network, comprising one or more processors, and a storage device comprising instructions executable to receive a user input including a natural language description of a request for an action on a content item from a dialogue agent configured to engage in dialogue using at least a language model, and generate a prompt for the language model based at least on the user input. The instructions are further executable to input the prompt to the language model to generate output describing operations for implementing the action, call a backend service of the social media network to execute commands to implement the operations, and output a result of executing the commands.

18 Claims, 7 Drawing Sheets

(56) References Cited

U.S. PATENT DOCUMENTS

| | | |
|---|---|---|
| 2019/0196698 A1 | 6/2019 | Cohen et al. |
| 2019/0259293 A1 | 8/2019 | Hellman et al. |
| 2020/0005157 A1 | 1/2020 | Rosenstein et al. |
| 2020/0066261 A1 | 2/2020 | Ganz et al. |
| 2021/0027065 A1 | 1/2021 | Chung et al. |
| 2021/0157618 A1 | 5/2021 | Moon |
| 2021/0272599 A1 | 9/2021 | Patterson et al. |
| 2022/0108726 A1 | 4/2022 | Li et al. |
| 2022/0229832 A1 | 7/2022 | Li et al. |
| 2023/0042221 A1 | 2/2023 | Xu et al. |
| 2023/0055241 A1 | 2/2023 | Zionpour et al. |
| 2023/0069133 A1 | 3/2023 | Matsuoka et al. |
| 2023/0074406 A1 | 3/2023 | Baeuml et al. |
| 2023/0135179 A1 | 5/2023 | Mielke et al. |
| 2023/0141807 A1* | 5/2023 | Groenewegen ........... G06F 8/33 717/106 |
| 2023/0244506 A1 | 8/2023 | Geller et al. |
| 2024/0038226 A1 | 2/2024 | Nouri et al. |
| 2024/0095077 A1 | 3/2024 | Singh et al. |
| 2024/0126997 A1 | 4/2024 | Bent, III et al. |
| 2024/0177739 A1 | 5/2024 | Su et al. |
| 2024/0179380 A1* | 5/2024 | Hannan ..................... G06T 7/70 |
| 2024/0211439 A1* | 6/2024 | Shah ..................... G06F 16/284 |
| 2024/0256773 A1* | 8/2024 | Correia Ribeiro .... G06F 40/166 |
| 2024/0394502 A1* | 11/2024 | Sami ..................... G06Q 20/227 |
| 2025/0005051 A1* | 1/2025 | Khosla ..................... G06F 9/547 |

FOREIGN PATENT DOCUMENTS

| | | |
|---|---|---|
| CN | 111726676 A | 9/2020 |
| CN | 114430499 A | 5/2022 |
| CN | 115129212 A | 9/2022 |
| CN | 116187282 A | 5/2023 |
| EP | 4354887 A1 | 4/2024 |
| JP | 2019109106 A | 7/2019 |
| WO | 2022260188 A1 | 12/2022 |

OTHER PUBLICATIONS

ISA Intellectual Property Office of Singapore, International Search Report Issued in Application No. PCT/SG2024/050423, Sep. 24, 2024, WIPO, 4 pages.

ISA Intellectual Property Office of Singapore, International Search Report Issued in Application No. PCT/SG2024/050424, Sep. 20, 2024, WIPO, 3 pages.

ISA Intellectual Property Office of Singapore, International Search Report Issued in Application No. PCT/SG2024/050425, Jul. 11, 2024, WIPO, 3 pages.

ISA Intellectual Property Office of Singapore, International Search Report Issued in Application No. PCT/SG2024/050427, Aug. 23, 2024, WIPO, 4 pages.

Teubner, T. et al., "Welcome to the Era of ChatGPT et al.: The Prospects of Large Language Models," Business & Information Systems Engineering, vol. 65, No. 2, Mar. 13, 2023, 7 pages.

* cited by examiner

SOCIAL MEDIA NETWORK DIALOGUE AGENT

BACKGROUND

A typical social media network enables users to share various types of multimedia content such as videos. The social media network may enable users to edit videos in various manners, such as trimming video length, adjusting playback speed, overlaying text, and adding transitions or other effects. To this end, a user interface (UI) may be provided with various controls for editing videos.

However, a significant downside to this approach is that many of these features remain undiscovered or underutilized by the average user. Often, users do not fully explore the available video editing capabilities due to the complex nature of the UI, a lack of understanding about the functions of specific tools, or the perceived difficulty of the editing process. As a result, many users may not take full advantage of these editing capabilities, and their content may not achieve the desired effect or impact.

An alternative approach enables users to engage application features through natural language queries. Such an approach may input natural language queries to a language model, which produces output describing how to achieve a desired outcome described in the queries. However, various types of malicious inputs are known to cause undesired or unpredictable outputs when fed to a language model. When employed in a social media context, a language model prompted with malicious input can produce inappropriate content and result in executing actions that would otherwise be unauthorized.

SUMMARY

Examples are provided relating to implementing actions on social media network content based on natural language inputs. One aspect includes a computing system configured to implement a social media network, comprising one or more processors, and a storage device comprising instructions executable to receive a user input including a natural language description of a request for an action on a content item from a dialogue agent configured to engage in dialogue using at least a language model, and generate a prompt for the language model based at least on the user input. The instructions are further executable to input the prompt to the language model to generate output describing operations for implementing the action, call a backend service of the social media network to execute commands to implement the operations, and output a result of executing the commands. For example, the request may be for editing the content item.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
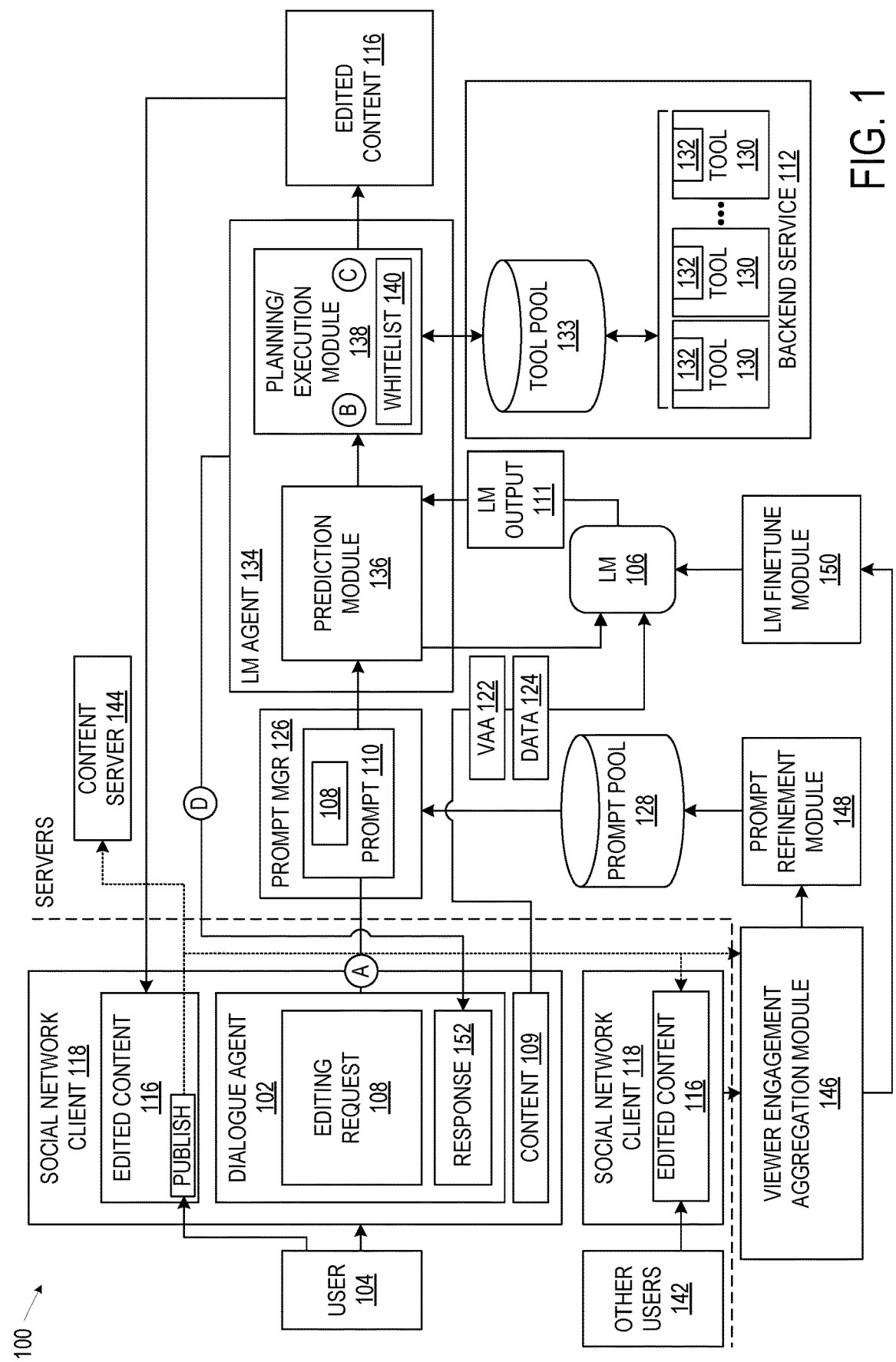
FIG. 1 illustrates a schematic view of a computing system according to an example of the present disclosure.

In view of the above issues, the present disclosure describes a computing system 100 configured to implement a social media network with a dialogue-assisted interface for performing actions on social media content items such as video content. Examples are presented in the context of performing editing actions for editing content items, but also apply to other types of actions that may be performed on content items, including but not limited to consuming, publishing, sharing, and reporting content items. Computing system 100 includes various processing and storage components to implement the social media network and associated features, examples of which are described below with reference to FIG. 7. In this example implementation, computing system 100 executes a frontend dialogue agent 102 configured to engage in a dialogue with a user 104 of the social media network using at least a language model 106. Computing system 100 receives a user input including a natural language description of an editing request 108 for a content item 109, and generates a prompt 110 for language model 106 based at least on the user input. Prompt 110 is input to language model 106 to generate language model output 111 describing one or more editing operations for editing content item 109. Computing system 100 calls a backend service 112 of the social media network via a frontend interface 114 to execute one or more commands to implement the editing operations and thereby obtain an edited version 116 of content item 109, where the edited version may be output to user 104 and/or shared in the social media network.

Dialogue agent 102 may be embodied as an online application service of an online social media platform or a 'chat bot', which refers to an automated software tool designed and programmed to interact with users of a social media application through text-based or voice-based natural language queries. In the example implementation depicted in FIG. 1, dialogue agent 102 is implemented in a social network client 118. Client 118 may be executed by a computing device operated by user 104, for example. In some implementations, client 118 may present a graphical user interface (GUI) through which interactions between dialogue agent 102 and user 104 may be conducted. The GUI may display text corresponding to user-agent dialogue, such as text representing a natural language query from user 104, or text representing a natural language response from dialogue agent 102. Dialogue agent 102 may implement privacy features to obtain user consent to send user input to language model 106. The dialog agent may also anonymize any personally identifiable information contained in user input sent to the language model.

Dialogue agent 102 uses language model 106 to formulate natural language responses and engage in dialogue with user 104. Among various potential topics and types of interactions that may be facilitated with user 104, dialogue agent 102 may utilize language model 106 to process natural language queries regarding content items (e.g., user-generated content) uploaded to the social media network by the user, such as content item 109. Content item 109 may be uploaded to the social media network via social network client 118, for example.

Where content item 109 comprises video content, the content item may be processed by a video asset analyzer 122 to generate video metadata 124. Video asset analyzer 122 may preprocess content item 109 to extract individual frames, analyze the visual content and audio content, and generate video metadata 124 including textual descriptions of the analyzed visual and audio content, recognized entities, timestamps for key events, and/or video captioning of the content item. In some implementations, language model 106 may receive video metadata 124, among other potential inputs that may be fed to the language model, to generate a contextually relevant natural language output or recommended action regarding content item 109. For example, language model 106 may be a multimodal language model capable of receiving as input both natural language input and images. To this end, language model 106 may be trained on various data types including but not limited to text, video, audio, and/or image data. In some implementations, language model 106 may be a large language model.

Language model 106 may be trained to engage in various types of dialogues with user 104, such as navigational conversations to guide the user to use a tool available in social network client 118, explorational conversations to suggest ideas for future content, or editing-focused conversations aiding the user in applying edits to content items as requested by the user and/or suggested via the language model. A series of edits may be chained together in an efficient way that normally would require significant user effort through a conventional user interface. Accordingly, a user with an idea of how to edit and thereby improve a content item, but who does not know the particular tools available for editing the content item, can be guided by editing-focused dialogue conducted with dialogue agent 102.

Computing system 100 includes a prompt manager 126 configured to generate prompts for input to language model 106 to thereby obtain language model output from the language model. A prompt may be generated based on user input comprising natural language queries. In the example depicted in FIG. 1, user input including a natural language description of editing request 108, which describes a request to edit content item 109, is received in dialogue conducted between user 104 and dialogue agent 102 via social network client 118. Computing system 100 uses prompt manager 126 to generate prompt 110 based at least on this user input. As indicated at element A and described in further detail below, the user input to prompt manager 126 may be filtered in various manners, such as filtering out queries not directed to editing content items or that are otherwise irrelevant to an editing context. Further, in some examples various types of preprocessing may be performed on the user input and natural language query therein, such as cleaning (e.g., removing unnecessary punctuation or irrelevant characters), tokenizing the query, and applying language detection or translation.

In generating prompts for language model 106, prompt manager 126 may access a prompt pool 128 that stores a plurality of predetermined prompts. For each content editing feature enabled by social network client 118, a sample prompt to language model 106 may be generated and added to prompt pool 128 that, when provided as input to the language model, is configured to produce output describing operations that can achieve the editing feature when performed. In the example implementation depicted in FIG. 1, editing features for editing content items are implemented by various tools 130 each callable at backend service 112 through a corresponding tool interface 132 such as a function call interface or application programming interface (API). Tool interfaces 132 may thus each provide a frontend interface to tools 130 and features in a backend of the social media network. Further, computing system 100 may include a tool pool 133 with which tools 130 are registered and from which tools, tool commands, tool functions, and/or tool interfaces 132 may be retrieved from the frontend of the social media network.

In some examples, tool interfaces 132 may be added, along with sample prompts, to prompt pool 128 for each editing tool. Sample prompts may thus include a description of a corresponding editing tool, a typical query directed or relevant to the tool, a defined input format to the tool, and potential intermediate actions to be executed when using the tool. Further, one or more function call or application programming interfaces may also be added to prompt pool 128 with each sample prompt that are callable to effect corresponding editing operations.

Upon receiving the user input from user 104 comprising a natural language description of editing request 108 for editing content item 109, prompt manager 126 queries prompt pool 128 for prompts whose descriptions are relevant to the editing request. Various predetermined and/or sample prompts may be combined to form a new prompt which can then be filled with data specific to editing request 108 to form prompt 110. As shown in the depicted example, prompt 110 may include editing request 108 or data derived from the editing request. In such examples, editing request 108 or derived data may be provided as input to language model 106 along with prompt 110.

Computing system 100 implements a language model agent 134 configured to prompt language model 106 to obtain language model output, and based on such language model output, generate tool commands callable at backend service 112 to achieve operations described in or related to the language model output. For example with reference to prompt 110 and via a prediction module 136, language model agent 134 provides the prompt, and potentially other data discussed above, as input to language model 106 to thereby obtain language model output 111 describing one or more editing operations for editing content item 109. When implemented, the editing operations may achieve at least part of editing request 108 as expressed in the natural language query from user 104. More specifically, prediction module 136 may perform inferencing on prompt 110 to predict a response to the prompt, and parse the response to obtain structured information including editing operations. Based on the structured information, language model agent 134 identifies, via an action planning and execution module 138, tools 130 that can be invoked at backend service 112 to achieve the editing operations. For natural language queries that are relatively open-ended or complex, language model agent 134 may perform self-exploration and generate various intermediate steps to achieve requests expressed in such queries. For each step, language model agent 134 may perform searching or follow-up questioning with a requesting user to iteratively approach a final dialogue response.

Having identified one or more tools 130 to achieve the editing operations described in language model output 111, language model agent 134 utilizes planning/execution module 138 to generate, for each tool, one or more tool commands callable via backend service 112 to implement a corresponding editing function of the tool. In some examples, language model 106 may be used to generate tool commands—e.g., based on tool commands retrieved from tool pool 133, and/or data retrieved from prompt pool 128. Further, in some scenarios, planning/execution module 138 may build a whitelist 140 of tool commands whose execution at backend service 112 is authorized. As described below, tool commands whose execution is authorized, and other tool commands whose execution is not authorized, may be established for different types of user queries, user account types or privilege levels, and/or on any other suitable basis. Thus, a whitelist of tool commands for a particular tool 130 may comprise a subset of an overall set of tool commands associated with the tool. In attempting to service editing request 108, a whitelist 140 may be established that omits tool commands not relevant to editing video content, for example.

Having generated tool commands for implementing the editing operations described in language model output 111 from language model 106, planning/execution module 138 calls backend service 112 to execute the tool commands and thereby implement the editing operations, producing edited version 116 of content item 109. In the depicted example, edited version 116 of content item 109 is provided to user 104 via social network client 118, which may provide the user with various options regarding the edited version, such as the ability to publish the edited version to the social media network to be shared with other users 142 who can engage with the edited version through the social network client. As an example, FIG. 1 depicts edited version 116 of content item 109 being sent from social network client 118 to a content server 144 from which the edited version can be accessed by other users 142.

Computing system 100 may include a viewer engagement aggregation module 146 configured to analyze the performance of edited content item 116, and generate performance analytics data for the edited content item after publication on the social media network. The performance of edited content item 116 may be observed based on factors including but not limited to view counts, likes, shares, comments, audience retention, and user engagement. For example, as users of the social media network view, like, share, and comment on edited content item 116, aggregation module 146 may track and record these interactions. Aggregation module 146 may also record metrics such as audience retention and overall user engagement, which may be a combination of analytics data regarding likes, comments, shares, and views.

The performance analytics data may be provided to a prompt refinement module 148 configured to update prompts in prompt pool 128 and potentially parameters or attributes of prompt manager 126. The performance analytics data may further be provided to a language model refinement module 150 configured to update parameters of language model 106. In this way, positive and negative engagement by users in the social media network with edited content item 116 may inform the selection, and enable continuous refinement, of prompts and natural language responses relating to editing requests and other natural language queries from users.

In addition to providing edited content item 116 to user 104, dialogue agent 102 may output a natural language response 152 to the user based on the edited content item. Response 152 may describe, as examples, one or more of the creation of edited content item 116, its availability to user 104 through social network client 118, or may engage the user in dialogue regarding publishing the edited content item to the social media network or further refining the edited content item. As described below, in some examples response 152 may be filtered before being provided to user 104 through client 118.

As mentioned above, various types of malicious inputs to language models are known that cause undesired or unpredictable output. As one example of such an input, a user may prompt a language model to provide a translation of text from one language to another language, yet ask the language model to produce an incorrect translation. As another example, a user may prompt the language model to perform an operation but arbitrarily repeat the operation a number of times. Other concerns may arise when the language model is prompted to take programmatic actions such as invoking services of a computing system implementing the language model, or manipulating files or other data stored at the computing system. In this case, the output from the language model, and whether such output is constrained to permitted actions, may be unpredictable, particularly as compared to other prompts that merely task the language model to process input content, where the actions taken are not prompted by the user but left to the language model or otherwise can be known before executing those actions.

Figure 2:
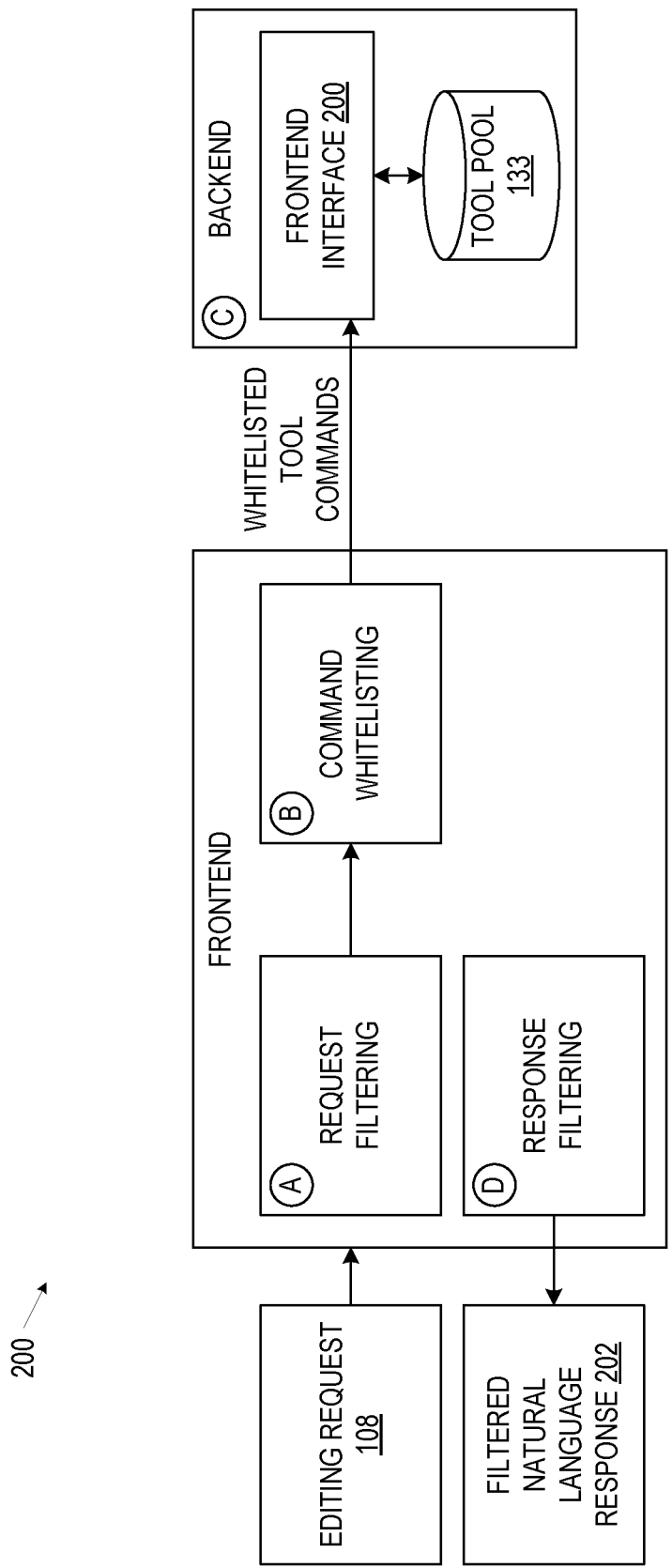
FIG. 2 illustrates a schematic view of a pipeline implementing various services of FIG. 1.

Computing system 100 addresses these issues through various services mentioned above and indicated at A, B, C, and D. FIG. 2 schematically depicts a pipeline 200 implementing services A-D to facilitate desired and authorized operation and output from language model 106, and separate frontend dialogue operations from backend tool and tool command execution. Computing system 100 may implement aspects of pipeline 200, for example.

As shown in FIGS. 1 and 2, service A is configured to filter editing request 108 from user 104 to edit content item 109. Filtering editing request 108, as well as other natural language requests from users, may include identifying malicious intent in requests and/or filtering out non-editing requests not directed to editing content items. Via service A, editing request 108 may be filtered to form filtered user input, where a prompt to language model 106 may be generated based on the filtered user input. Other types of filtering on user input may be performed, such as limiting user queries to a time range (e.g., daily). In this way, irrelevant queries not directed to editing content items, or queries that attempt to directly request backend execution of commands, may be omitted from prompts input to language model 106.

As noted above, language model output from language model 106 may describe editing operations for editing a content item, where implementing the editing operations achieves at least part of, or is otherwise relevant to, an editing request expressed in a natural language query from a user. Various processing may be performed on the description of the editing operations, including filtering the editing operations, and translating the editing operations into tool commands, or otherwise generating tool commands, for effecting at least a portion of the editing operations. Service B is configured to build a whitelist of tool commands whose backend execution is authorized. For example, a set of tools 130 available at backend service 112 may be identified via tool pool 133 for achieving a set of editing operations. Each tool may provide a corresponding set of tool commands each executable to achieve a corresponding tool function. Service B may determine, for a set of tool commands associated with a corresponding tool, whether the tool command is registered in a tool command whitelist for the corresponding tool. The tool command whitelist may comprise a subset of an overall tool command pool available for the tool, for example. As depicted in FIG. 2, whitelisted tool commands are passed to backend service 112, which is called to execute the whitelisted tool commands, whereas non-whitelisted tool commands are not passed to or executed by the backend service. In this way, a set of known tools, tool commands, and editing operations whose execution is authorized may be established at the backend.

Tool commands may be selectively authorized and blocked based on other criteria. In one example, first and second tool commands may be generated for editing a content item based on language model output. The first and second tool commands may be compared to a privilege level associated with a user account of a user who requested to edit the content item. Where it is determined (e.g., via planning/execution module 138) that the first tool command is authorized for the privilege level, the first tool command may be executed at backend service 112. Conversely, where it is determined that the second tool command is not authorized for the privilege level, the second tool command may be blocked from being executed at backend service 112. Yet other criteria may be evaluated in selectively executing tool commands, including but not limited to account type, user attributes, and subscription type.

The provision of a frontend and backend, and separation of frontend functions (e.g., dialogue) from backend functions (e.g., executing tool commands) is indicated by service C. Such an architecture ensures that users interacting with the social media network are not provided the ability to directly call backend services or execute tool commands. Instead, as described above, whitelisted tool commands may be derived from language model output, and passed from the frontend to backend via a frontend interface 200 through which tool functions may be called and tool commands executed. Frontend interface 200 may comprise tool interfaces 132, for example.

FIG. 2 further depicts filtering, via service D, of a natural language response output from dialogue agent 102 based on edited content item 116. Here, filtering the response output from dialogue agent 102 produces a filtered natural language response 202 (e.g., response 152). Filtering via service D may include a programmatic, automated review of the initial response from dialogue agent 102 and potentially filtering the initial response via one or both of sensitive word detection or intention detection. Sensitive words may be omitted from filtered natural language response 202, for example. In this way, the provision of inappropriate or undesired content in output to users of the social media network may be averted.

In some examples, personalized output may be provided in response to a natural language query from a user. In such examples, prompts to language model 106 formulated based on the query may not include personal data regarding the user. Instead, output to the user may be personalized with data regarding the user that is made available at the backend. In some examples, a video content item may be edited to include an audio or graphical asset, which may be recommended to a user based on a feature vector or other suitable data structure representing engagement by the user with the social media network.

Figure 3:
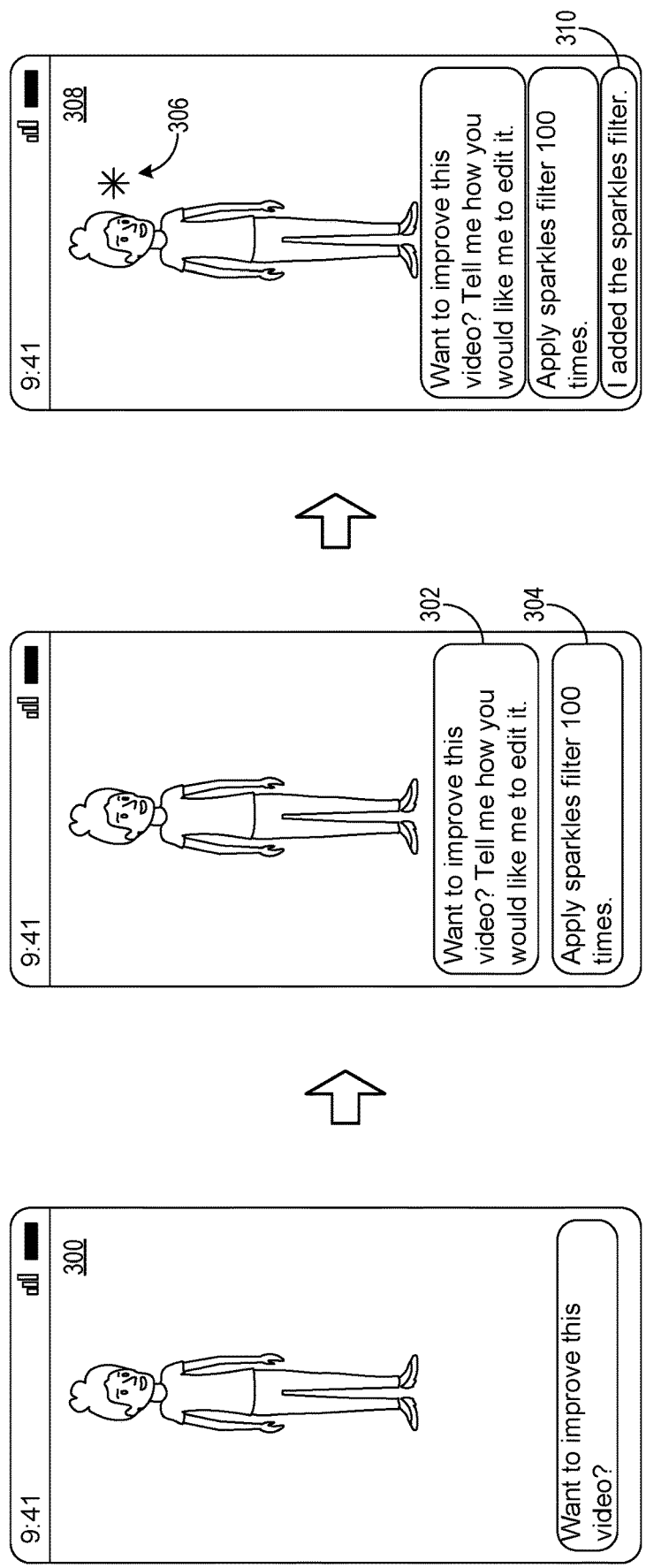
FIGS. 3 to 5 illustrate examples of interactions between a user and the dialogue agent of FIG. 1.

FIG. 3 depicts an example illustrating interactions between a user of the social media network and dialogue agent 102 conducted through a GUI presented by social network client 118. In this example, the user has uploaded a video content item 300 to the social media network via client 118. Dialogue agent 102 prompts the user with "Want to improve this video?" The user interacts with this prompt, and dialogue agent 102 prompts 302 the user further, "Want to improve this video? Tell me how you would like me to edit it." The user responds with a natural language query 304 including an editing request to edit video content item 300 that requests dialogue agent 102 to "Apply sparkles filter 100 times." Here, the user requests the addition of a graphical asset in the form of a sparkles filter. However, the operation requested in the editing request—namely, the addition of the graphical asset—is asked to be arbitrarily repeated 100 times. As this repetition would unnecessarily consume compute resources at the social media network, this repetition portion of the editing request is filtered out from natural language query 304 via service A (e.g., as implemented by prompt manager 126). A filtered natural language query (e.g., "Apply sparkles filter" without requesting the operation be repeated) is then used to formulate a prompt to language model 106 to ultimately invoke a sparkles filter tool and associated command(s) that add a sparkle graphical asset 306 and thereby form an edited version 308 of video content item 300. Dialogue agent 102 formulates a natural language response 310 ("I added the sparkles filter.") describing the addition of graphical asset 306. Dialogue agent 102 may engage the user in subsequent conversation, directed for example to further edits, publishing edited version 308, or any other suitable topics.

Figure 4:
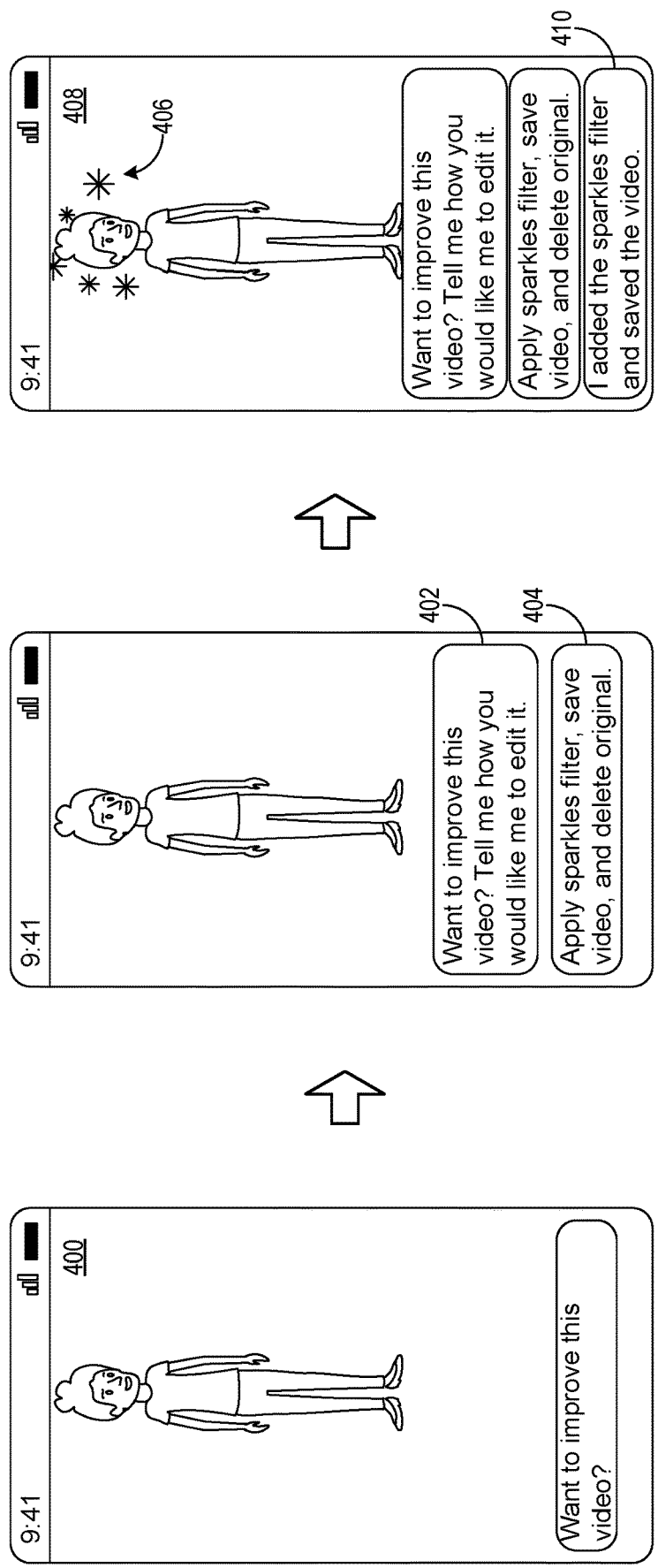

FIG. 4 depicts another example illustrating interactions between a user of the social media network and dialogue agent 102 conducted via social network client 118. In this example, the user has uploaded a video content item 400 to the social media network via client 118. Dialogue agent 102 prompts the user with "Want to improve this video?" The user interacts with this prompt, and dialogue agent 102 prompts 402 the user further, "Want to improve this video? Tell me how you would like me to edit it." The user responds with a natural language query 404 including an editing request to edit video content item 400 that requests dialogue agent 102 to "Apply sparkles filter, save video, and delete original." Here, the user requests (1) the addition of a graphical asset in the form of a sparkles filter, (2) saving the edited version of video content item 400 with the graphical asset added, and (3) deleting the original, unedited video content item 400. Based on this request, a prompt is formulated and input to language model 106 to obtain language model output describing editing operations for effecting the editing request, and tools and associated tool commands are generated that when executed implement the editing operations. However, via service B (e.g., as implemented at planning/execution module 138) one or more tool commands associated with deleting video content items are determined as not being registered in whitelist 140, which comprises whitelisted tool commands. As such, these non-whitelisted tool commands are not called at backend service 112 or executed. Conversely, tool commands associated with applying a sparkle graphical asset 406, and saving a resultant edited version 408 of video content item 400, are determined to be registered in whitelist 140 and are thus executed. Dialogue agent 102 formulates a natural language response 410 ("I added the sparkles filter and saved the video.") describing the addition of graphical asset 406 and saving of edited version 408.

Figure 5:
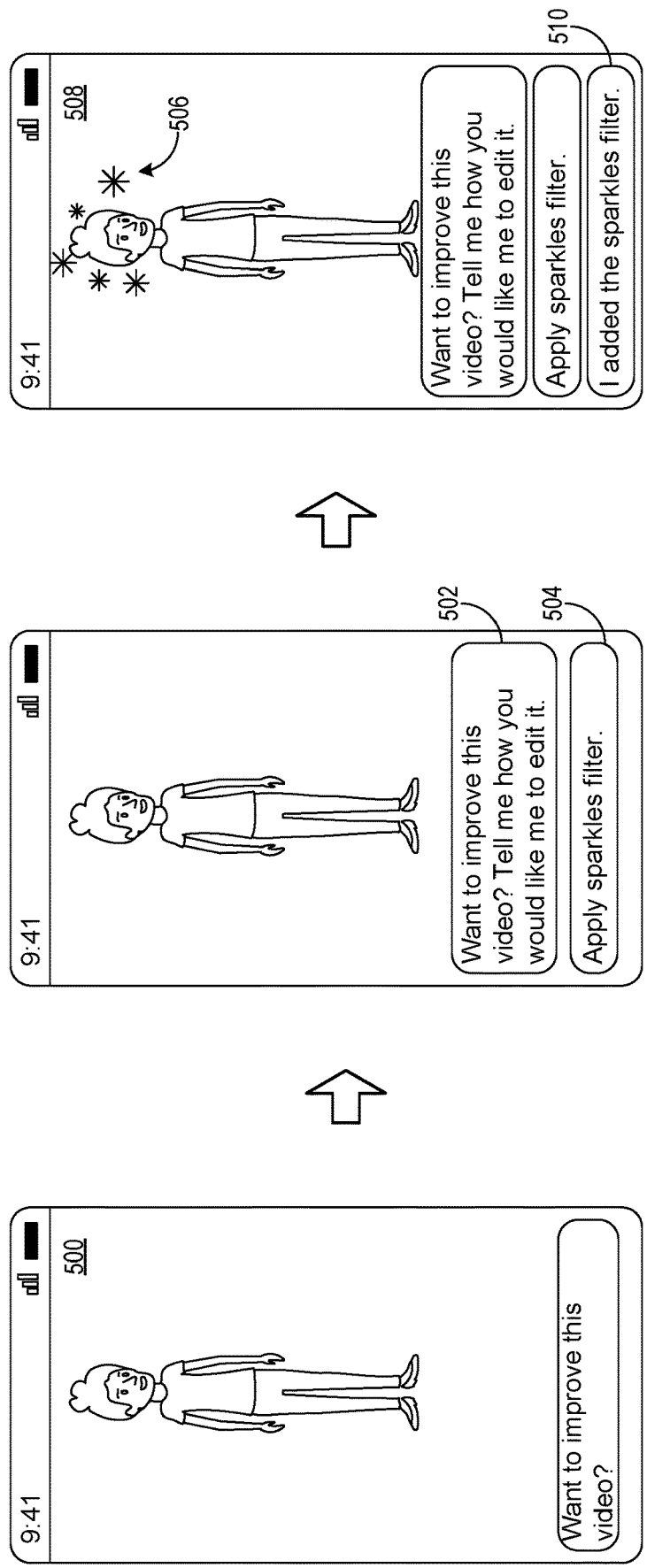

FIG. 5 depicts another example illustrating interactions between a user of the social media network and dialogue agent 102 conducted via social network client 118. In this example, the user has uploaded a video content item 500 to the social media network via client 118. Dialogue agent 102 prompts the user with "Want to improve this video?" The user interacts with this prompt, and dialogue agent 102 prompts 502 the user further, "Want to improve this video? Tell me how you would like me to edit it." The user responds with a natural language query 504 including an editing request to edit video content item 500 that requests dialogue agent 102 to "Apply sparkles filter." Here, the user requests the addition of a graphical asset in the form of a sparkles filter. This request results in the addition of a sparkle graphical asset 506, thereby producing an edited version 508 of video content item 500. Based on edited version 508, dialogue agent 102 also formulates a natural language response 510 describing the addition of graphical asset 506. However, natural language response 510 is a filtered response that is filtered via service D (e.g., as implemented by language model agent 134) before presentation to the user via dialogue agent 102. In particular, sentiment detection performed as part of natural language response filtering detects a negative sentiment in the unfiltered response ("I added the sparkles filter. The sparkles don't look very good on you.") Accordingly, the negative sentiment portion of the unfiltered response ("The sparkles don't look very good on you.") is filtered out to produce filtered natural language response 510 ("I added the sparkles filter."), which is output to the user via dialogue agent 102.

Figure 6:
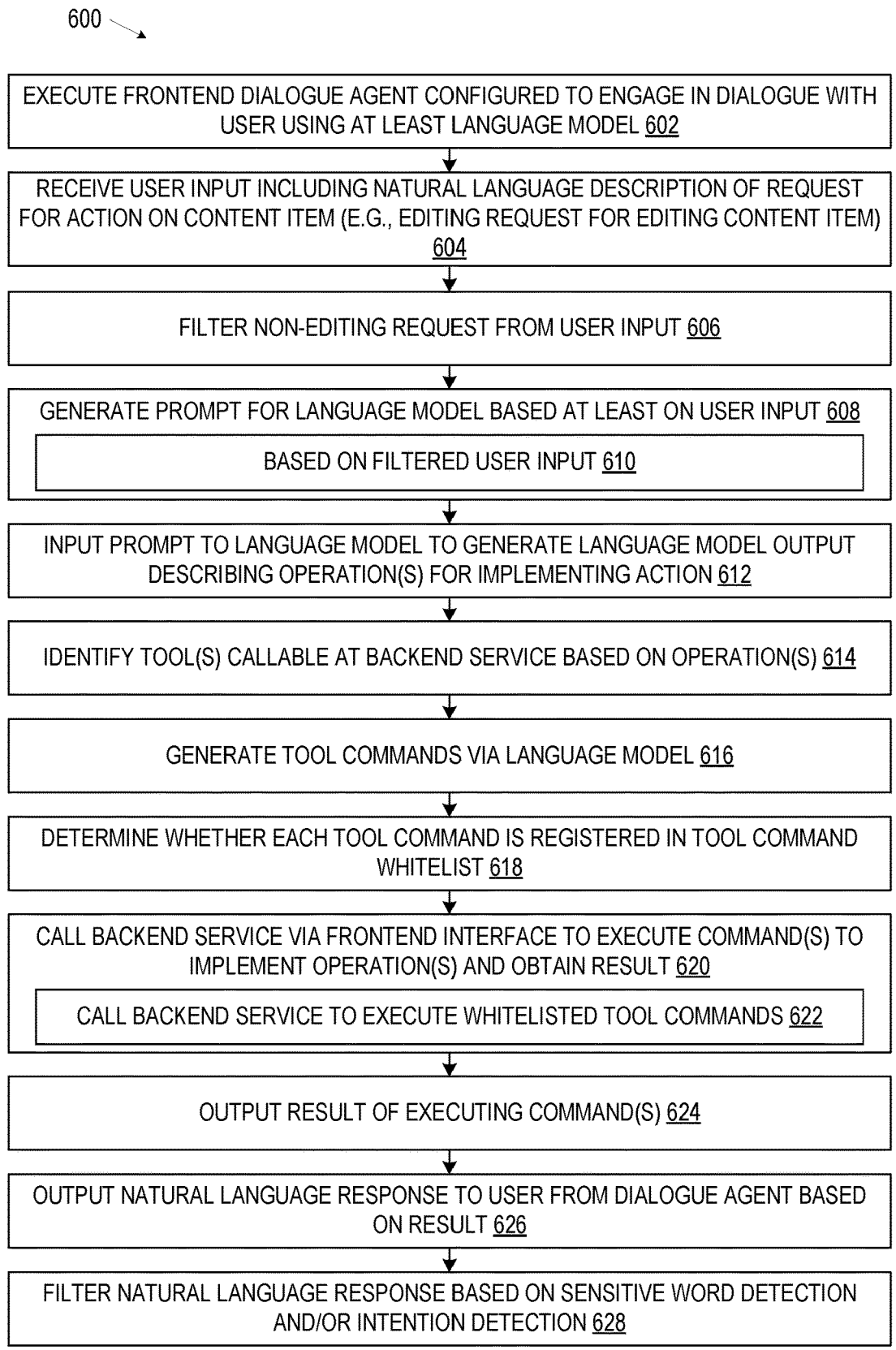
FIG. 6 is a flowchart of a method according to an example of the present disclosure.

FIG. 6 depicts a flowchart illustrating an example method 600 of implementing one or more operations on a content item via a dialogue-assisted interface. Method 600 may be implemented at computing system 100, for example.

At 602, method 600 includes executing a frontend dialogue agent configured to engage in a dialogue with a user of the social media network using at least a language model. At 604, method 600 includes receiving a user input including a natural language description of a request for an action on a content item. The request may include an editing request for editing the content item, for example. At 606, method 600 includes filtering a non-editing request not directed to editing the content item from the user input to form filtered user input. At 608, method 600 includes generating a prompt for the language model based at least on the user input. As indicated at 610, in examples where filtered user input is formulated, method 600 includes generating the prompt based on the filtered user input.

At 612, method 600 includes inputting the prompt to the language model to generate a language model output describing one or more operations for implementing the action. Where the request is an editing request to edit the content item, the operation(s) may include editing operation(s) for editing the content item, for example. At 614, method 600 includes identifying one or more tools callable at the backend service based on the one or more operations. Where the operations include editing operations for editing the content item, the tools may be callable to edit the content item. At 616, method 600 includes generating, for each of the one or more tools, one or more tool commands via the language model for implementing the one or more operations. At 618, method 600 includes determining, for each tool command of the one or more tool commands, whether the tool command is registered in a tool command whitelist for the corresponding tool. The tool command whitelist may comprise a subset of an overall pool of tool commands for the corresponding tool, for example.

At 620, method 600 includes calling the backend service of the social media network via a frontend interface to execute one or more commands to implement the one or more operations. Where the operations include editing operations, the commands may be executed to implement the editing operations, thereby producing an edited version of the content item. As indicated at 622, the backend service may be called to execute whitelisted tool commands. At 624, method 600 includes outputting a result of executing the one or more commands. The result may include the edited version of the content item, for example. At 626, method 600 includes outputting a natural language response to the user from the dialogue agent based on the result. Where the result includes the edited version, the natural language response may be output based on the edited version. At 628, method 600 includes filtering the natural language response via one or both of sensitive word detection or intention detection.

It will be understood that the approaches described herein can be adapted to any suitable type of operation directed to content items in a social media network, including operations directed to editing content items and other non-editing operations. Examples of operations include but are not limited to publishing content items, viewing or otherwise consuming content items, sharing content items, and reporting content items (e.g., as inappropriate).

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
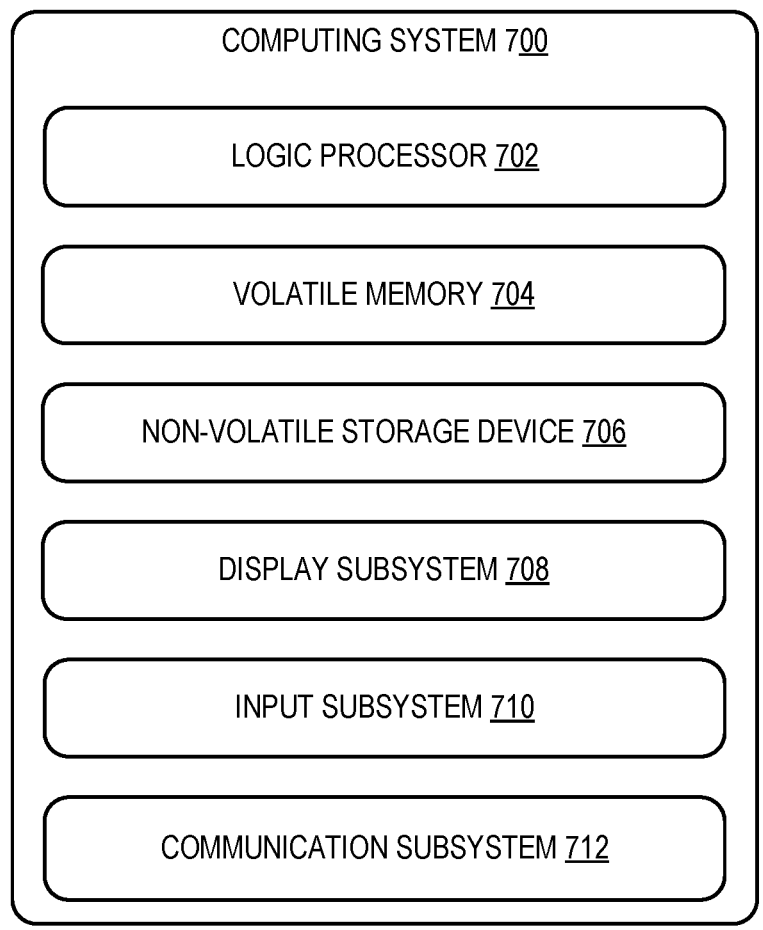
FIG. 7 shows an example computing environment of the present disclosure.

FIG. 7 schematically shows a non-limiting embodiment of a computing system 700 that can enact one or more of the methods and processes described above. Computing system 700 is shown in simplified form. Computing system 700 may embody the computer system 100 described above and illustrated in FIG. 1. Computing system 700 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 700 includes a logic processor 702 volatile memory 704, and a non-volatile storage device 706. Computing system 700 may optionally include a display subsystem 708, input subsystem 710, communication subsystem 712, and/or other components not shown in FIG. 7.

Logic processor 702 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 702 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 706 includes one or more physical devices configured to hold instructions executable by the logic processors to implement the methods and processes described herein. When such methods and processes are implemented, the state of non-volatile storage device 706 may be transformed—e.g., to hold different data.

Non-volatile storage device 706 may include physical devices that are removable and/or built in. Non-volatile storage device 706 may include optical memory (e.g., CD, DVD, HD-DVD, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 706 may include nonvolatile, dynamic, static, read/write, read-only, sequential-access, location-addressable, file-addressable, and/or content-addressable devices. It will be appreciated that non-volatile storage device 706 is configured to hold instructions even when power is cut to the non-volatile storage device 706.

Volatile memory 704 may include physical devices that include random access memory. Volatile memory 704 is typically utilized by logic processor 702 to temporarily store information during processing of software instructions. It will be appreciated that volatile memory 704 typically does not continue to store instructions when power is cut to the volatile memory 704.

Aspects of logic processor 702, volatile memory 704, and non-volatile storage device 706 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 typically implemented in software by a processor to perform a particular function using portions of volatile memory, which function involves transformative processing that specially configures the processor to perform the function. Thus, a module, program, or engine may be instantiated via logic processor 702 executing instructions held by non-volatile storage device 706, using portions of volatile memory 704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 708 may be used to present a visual representation of data held by non-volatile storage device 706. The visual representation may take the form of a graphical user interface (GUI). As the herein described methods and processes change the data held by the non-volatile storage device, and thus transform the state of the non-volatile storage device, the state of display subsystem 708 may likewise be transformed to visually represent changes in the underlying data. Display subsystem 708 may include one or more display devices utilizing virtually any type of technology. Such display devices may be combined with logic processor 702, volatile memory 704, and/or non-volatile storage device 706 in a shared enclosure, or such display devices may be peripheral display devices.

When included, input subsystem 710 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; and/or any other suitable sensor.

When included, communication subsystem 712 may be configured to communicatively couple various computing devices described herein with each other, and with other devices. Communication subsystem 712 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

The following paragraphs provide additional description of the subject matter of the present disclosure. One example provides a computing system configured to implement a social media network, the computing system comprising one or more processors, and a storage device comprising instructions executable by the one or more processors to receive a user input including a natural language description of a request for an action on a content item from a frontend dialogue agent configured to engage in a dialogue with a user of the social media network using at least a language model, generate a prompt for the language model based at least on the user input, input the prompt to the language model to generate a language model output describing one or more operations for implementing the action, call a backend service of the social media network via a frontend interface to execute one or more commands to implement the one or more operations, and output a result of executing the one or more commands. In such an example, the request for the action on the content item may include a request for editing the content item, the one or more operations may include one or more editing operations for editing the content item, and the result of executing the one or more commands may include an edited version of the content item. In such an example, the computing system alternatively or additionally may comprise instructions executable to identify one or more tools callable at the backend service for editing the content item based on the one or more editing operations, wherein each of the one or more commands is a tool command of a corresponding tool of the one or more tools. In such an example, the computing system alternatively or additionally may comprise instructions executable to, for each tool command of the one or more tool commands, determine whether the tool command is registered in a tool command whitelist for the corresponding tool, the tool command whitelist comprising a subset of tool commands for the corresponding tool, and for each tool command in the tool command whitelist, call the backend service to execute the tool command. In such an example, the computing system alternatively or additionally may comprise instructions executable to output a natural language response to the user from the dialogue agent based on the edited version of the content item. In such an example, the computing system alternatively or additionally may comprise instructions executable to filter the natural language response via one or both of sensitive word detection or intention detection. In such an example, the computing system alternatively or additionally may comprise instructions executable to filter a non-editing request not directed to editing the content item from the user input to form filtered user input, wherein the instructions executable to generate the prompt for the language model are executable to generate the prompt based on the filtered user input. In such an example, the content item may comprise video content, and the computing system alternatively or additionally may comprise instructions executable to, responsive to receiving a user input to share the edited version of the video content, share the edited version of the video content on the social media network. In such an example, the prompt to the language model alternatively or additionally may not include data regarding the user. In such an example, the one or more operations and the one or more commands alternatively or additionally may be generated by the language model. In such an example, the one or more operations alternatively or additionally may include adding an asset to the content item, the asset including one or more of an effect, a filter, a sticker, music, an emoji, an avatar, or text, and the computing system alternatively or additionally may comprise instructions executable to call the backend service to recommend the asset to the user based on a feature vector representing engagement by the user with the social media network. In such an example, the computing system alternatively or additionally may comprise instructions executable to generate a first tool command for operating on the content item, and a second tool command for operating on the content item, based on the language model output, compare the first tool command and the second tool command to a privilege level associated with a user account of the user of the social media network, responsive to determining that the first tool command is authorized for the privilege level, execute the first tool command at the backend service, and responsive to determining that the second tool command is not authorized for the privilege level, block executing the second tool command at the backend service.

Another example provides a method for implementing a social media network, comprising receiving a user input including a natural language description of a request for an action on a content item from a frontend dialogue agent configured to engage in a dialogue with a user of the social media network using at least a language model, generating a prompt for the language model based at least on the user input, inputting the prompt to the language model to generate a language model output describing one or more operations for implementing the action, calling a backend service of the social media network via a frontend interface to execute one or more commands to implement the one or more operations, and outputting a result of executing the one or more commands. In such an example, the request for the action on the content item may include a request for editing the content item, the one or more operations may include one or more editing operations for editing the content item, and the result of executing the one or more commands may include an edited version of the content item. In such an example, the method alternatively or additionally may comprise identifying one or more tools callable at the backend service for editing the content item based on the one or more editing operations, wherein each of the one or more commands is a tool command of a corresponding tool of the one or more tools. In such an example, the method alternatively or additionally may comprise, for each tool command of the one or more tool commands, determining whether the tool command is registered in a tool command whitelist for the corresponding tool, the tool command whitelist comprising a subset of tool commands for the corresponding tool, and for each tool command in the tool command whitelist, calling the backend service to execute the tool command. In such an example, the method alternatively or additionally may comprise outputting a natural language response to the user from the dialogue agent based on the edited version of the content item. In such an example, the method alternatively or additionally may comprise generating a first tool command for operating on the content item, and a second tool command for operating on the content item, based on the language model output, comparing the first tool command and the second tool command to a privilege level associated with a user account of the user of the social media network, responsive to determining that the first tool command is authorized for the privilege level, executing the first tool command at the backend service, and responsive to determining that the second tool command is not authorized for the privilege level, blocking executing the second tool command at the backend service. Another example provides a non-transitory computer-readable medium comprising computer-readable instructions that, when executed by a computing device, cause the computing device to implement the method of the above example.

Another example provides a computing system configured to implement a social media network, the computing system comprising one or more processors, and a storage device comprising instructions executable by the one or more processors to receive, via a user interface, a user input including a natural language description of a request for an action on a content item from a frontend dialogue agent configured to engage in a dialogue, via the user interface, with a user of the social media network using at least a language model, filter the user input to thereby form filtered user input, generate a prompt for the language model based at least on the filtered user input, input the prompt to the language model to generate a language model output describing one or more operations for implementing the action, call a backend service of the social media network via a frontend interface to execute one or more commands to implement the one or more operations, output a result of executing the one or more commands, formulate a natural language response to the user from the dialogue agent based on the result, filter the natural language response to thereby form a filtered natural language response, and output, via the user interface, the filtered natural language response.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system configured to implement a social media network, the computing system comprising:
   one or more processors; and
   a storage device comprising instructions executable by the one or more processors to:
      receive a user input including a natural language description of a request for an action on a content item;
      generate a prompt for a language model based at least on the user input;
      input the prompt to the language model to generate a language model output describing one or more operations for implementing the action;
      call a backend service of the social media network to execute one or more commands to implement the one or more operations;
      output a result of executing the one or more commands;
      generate a first tool command for operating on the content item, and a second tool command for operating on the content item, based on the language model output;
      compare the first tool command and the second tool command to a privilege level associated with a user account of a user of the social media network;
      responsive to determining that the first tool command is authorized for the privilege level, execute the first tool command at the backend service; and
      responsive to determining that the second tool command is not authorized for the privilege level, block executing the second tool command at the backend service.

2. The computing system of claim 1, wherein
   the request for the action on the content item includes a request for editing the content item,
   the one or more operations include one or more editing operations for editing the content item, and
   the result of executing the one or more commands includes an edited version of the content item.

3. The computing system of claim 2, wherein the storage device further comprises instructions executable to identify one or more tools callable at the backend service for editing the content item based on the one or more editing operations, each of the one or more commands is a tool command of a corresponding tool of the one or more tools.

4. The computing system of claim 3, wherein the storage device further comprises instructions executable to:
   for each tool command of the one or more tool commands, determine whether the tool command is registered in a tool command whitelist for the corresponding tool, the tool command whitelist comprising a subset of tool commands for the corresponding tool; and
   for each tool command in the tool command whitelist, call the backend service to execute the tool command.

5. The computing system of claim 2, wherein the storage device further comprises instructions executable to output a natural language response to the user based on the edited version of the content item.

6. The computing system of claim 5, wherein the storage device further comprises instructions executable to filter the natural language response via one or both of sensitive word detection or intention detection.

7. The computing system of claim 2, wherein the storage device further comprises instructions executable to filter a non-editing request not directed to editing the content item from the user input to form filtered user input, wherein the instructions executable to generate the prompt for the language model are executable to generate the prompt based on the filtered user input.

8. The computing system of claim 2, wherein the content item comprises video content, and the storage device further comprises instructions executable to, responsive to receiving a user input to share the edited version of the video content, share the edited version of the video content on the social media network.

9. The computing system of claim 1, wherein the prompt to the language model does not include data regarding the user.

10. The computing system of claim 1, wherein the one or more operations and the one or more commands are generated by the language model.

11. The computing system of claim 1, wherein the one or more operations include adding an asset to the content item, the asset including one or more of an effect, a filter, a sticker, music, an emoji, an avatar, or text, and the storage device further comprises instructions executable to call the backend service to recommend the asset to the user based on a feature vector representing engagement by the user with the social media network.

12. A method for implementing a social media network, comprising:
   receiving a user input including a natural language description of a request for an action on a content item;
   generating a prompt for a language model based at least on the user input;
   inputting the prompt to the language model to generate a language model output describing one or more operations for implementing the action;
   calling a backend service of the social media network to execute one or more commands to implement the one or more operations;
   outputting a result of executing the one or more commands;
   generating a first tool command for operating on the content item, and a second tool command for operating on the content item, based on the language model output;
   comparing the first tool command and the second tool command to a privilege level associated with a user account of a user of the social media network;
   responsive to determining that the first tool command is authorized for the privilege level, executing the first tool command at the backend service; and
   responsive to determining that the second tool command is not authorized for the privilege level, blocking executing the second tool command at the backend service.

13. The method of claim 12, wherein
   the request for the action on the content item includes a request for editing the content item,
   the one or more operations include one or more editing operations for editing the content item, and
   the result of executing the one or more commands includes an edited version of the content item.

14. The method of claim 13, further comprising identifying one or more tools callable at the backend service for editing the content item based on the one or more editing operations, wherein each of the one or more commands is a tool command of a corresponding tool of the one or more tools.

15. The method of claim 14, further comprising:
   for each tool command of the one or more tool commands, determining whether the tool command is registered in a tool command whitelist for the corresponding tool, the tool command whitelist comprising a subset of tool commands for the corresponding tool; and for each tool command in the tool command whitelist, calling the backend service to execute the tool command.

16. The method of claim 13, further comprising outputting a natural language response to the user based on the edited version of the content item.

17. A non-transitory computer-readable medium comprising computer-readable instructions that, when executed by a computing device, cause the computing device to implement the method of claim 12.

18. A computing system configured to implement a social media network, the computing system comprising:
one or more processors; and
a storage device comprising instructions executable by the one or more processors to:
receive, via a user interface, a user input including a natural language description of a request for an action on a content item;
filter the user input to thereby form filtered user input;
generate a prompt for a language model based at least on the filtered user input;
input the prompt to the language model to generate a language model output describing one or more operations for implementing the action;
call a backend service of the social media network to execute one or more commands to implement the one or more operations;
output a result of executing the one or more commands;
formulate a natural language response based on the result;
filter the natural language response to thereby form a filtered natural language response;
output, via the user interface, the filtered natural language response;
generate a first tool command for operating on the content item, and a second tool command for operating on the content item, based on the language model output;
compare the first tool command and the second tool command to a privilege level associated with a user account of a user of the social media network;
responsive to determining that the first tool command is authorized for the privilege level, execute the first tool command at the backend service; and
responsive to determining that the second tool command is not authorized for the privilege level, block executing the second tool command at the backend service.

* * * * *